United States Patent [19] [11] 3,754,955
Kienzle et al. [45] Aug. 28, 1973

[54] PHTHALOCYANINES
[76] Inventors: Jean Andre Paul Kienzle, 1 rue du Plessis; Michel Ernest Antoine Huille, 7 rue Ribot, both of Creil; Louis Antoine Cabut, 40 rue Pierre Semand, Nogent sur Oise, all of France
[22] Filed: Nov. 22, 1971
[21] Appl. No.: 201,202

[30] Foreign Application Priority Data
Nov. 20, 1970 France .............................. 7041758

[52] U.S. Cl. ........................ 106/288 Q, 260/314.5
[51] Int. Cl. .................................... C08h 17/14
[58] Field of Search ............................ 106/288 Q

[56] References Cited
UNITED STATES PATENTS
3,646,003  2/1972  Lamure .......................... 106/288 Q
FOREIGN PATENTS OR APPLICATIONS
758,485  5/1967  Canada .......................... 106/288 Q
949,739  2/1964  Great Britain .................. 106/288 Q Primary Examiner—Delbert E. Gantz
Assistant Examiner—James W. Hellwege
Attorney—Francis C. Browne, Joseph A. DeGrandi et al.

[57] ABSTRACT
Phthalocyanine compounds of the formula:

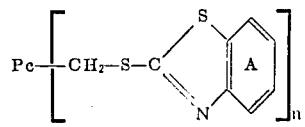

in which Pc is a phthalocyanine residue, the benzene nucleus A is unsubstituted or substituted by at least one alkyl group having up to 4 carbon atoms and $n$ represents a whole number from 1 to 8; phthalocyanine pigment mixtures containing such a compound; process for the stabilisation of phthalocyanine pigments which comprises incorporating therein at least one compound of formula (I); and paints, lacquers, enamels, inks and plastic materials coloured by means of phthalocyanine pigment mixture containing a compound formula (I).

6 Claims, No Drawings

PHTHALOCYANINES

The invention relates to phthalocyanine compounds and to phthalocyanine pigment mixtures which are stable towards crystallisation.

It is known that the $\alpha$ form of copper phthalocyanine has the drawback of crystallising. The crystallisation or growth of the crystals takes place slowly in the cold and rapidly in the hot on contact with aromatic hydrocarbons. For example, in a paint kept in a can and containing such solvents, the micro-crystals of the pigment are slowly changed into larger crystals with a considerable loss of colouring power. This phenomenon constitutes an objection against the use of this substance in inks, paints and plastics. The crystallisation of the $\alpha$ form represents a change into the more stable $\beta$ form. The reduction in the colouring power is due to the relatively large dimensions of the slowly developed crystals of $\beta$ form. In addition, since the $\beta$ form is greener than the $\alpha$ form, an alteration of shade is observed at the same time.

With the object of making the $\alpha$ form of copper phthalocyanine non-crystallising, it has been proposed to stabilise it by mixing it with another metallic phthalocyanine or by coating the particles with colourless protecting substances. This coating however also involves a reduction of colouring power.

It has now been found that the crystallisation can be prevented by mixing the phthalocyanines with a compound of the general formula:

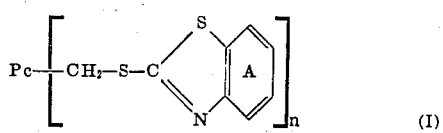

in which Pc represents a phthalocyanine residue, the benzene nucleus A is unsubstituted or substituted by at least one alkyl group having up to 4 carbon atoms and $n$ represents a whole number from 1 to 8, preferably 3 or 4.

The phthalocyanine of residue Pc may or may not be metallised. The phthalocyanine of the residue Pc may be copper phthalocyanine in its $\alpha$ or $\beta$ form or a halogenated derivative thereof, especially a chlorinated derivative containing up to 4 percent of chlorine.

The compounds of formula (I) may be prepared by reacting a chloromethylated derivative of phthalocyanine with a 2-mercapto-benzothiazole, the benzene nucleus of which is unsubstituted or substituted by at least one alkyl group having up to 4 carbon atoms, using at least the same number of moles of 2-mercapto-benzothiazole as the number of chloromethyl groups.

The chloromethylated derivatives of phthalocyanine may be obtained by known processes, for example by condensing a phthalocyanine with symmetrical dichlorodimethyl ether or with paraformaldehyde in the presence of aluminium chloride or chlorosulphonic acid. The known processes of halo-methylation usually give mixtures of halo-methylated derivatives and these mixtures are suitable for preparing the compounds of formula (I). The reaction is preferably effected in the presence of an alkaline substance, such as sodium hydroxide or sodium carbonate. The reaction may be carried out at temperatures between 50° and 100° C. either in an excess of 2-mercapto-benzothiazole or in a solvent. Having regard to the above-defined reaction conditions, polar solvents, such as isopropanol or ethyl Cellosolve, may be used; only the thiol reacts. ("Cellosolve" is a Trade Mark).

The pigment mixtures of the present invention may be advantageously prepared by incorporation. The incorporation of compounds of formula (I) into the phthalocyanines to be stabilized may be effected in several ways. For example, the compound of formula (I) and the phthalocyanine to be stabilised may be ground together in the dry state, preferably with a grinding aid such as sodium sulphate. The compound of formula (I) and the phthalocyanine to be stabilised may be introduced together into a solvent, such as sulphuric acid, and precipitated by the introduction of the solution into water while preventing too great a rise in temperature. After precipitation, the pigment mixture is filtered off, washed and dried.

The compound of formula (I) and the phthalocyanine pigment to be stabilised may also be simply admixed in the dry state by agitation without the grinding action.

The pigment mixtures of the present invention preferably contain 1 to 20 percent of the compound of formula (I), based on the total weight of the mixture.

The phthalocyanine pigment mixtures may also be prepared by attaching chloromethyl groups to the phthalocyanine to be stabilised by means of partial chloromethylation and then reacting the partly chloromethylated phthalocyanine with a 2-mercapto-benzothiazole.

The compounds of formula (I), which are soluble in the aromatic solvents, have the property of not being leached out in the solvents when they form part of pigment compositions.

The phthalocyanine pigment mixtures of the present invention are particularly good as colouring materials for paints, lacquers, enamels, printing inks and plastic materials since they are rapidly dispersed in non-aqueous media and offer a strong resistance to the growth of the crystals.

The following Examples, in which the parts are parts by weight, illustrate the invention without restricting it.

EXAMPLE 1

20 parts of 2-mercapto-benzothiazole and 6 parts of caustic soda are dissolved in 140 parts of glycol monoethyl ether. Then 14 parts of tris-(chloromethyl) copper phthalocyanine are added and the mixture is heated under reflux with stirring for eight hours. The resulting mixture is cooled, the product filtered off, washed with alcohol to eliminate excess mercapto-benzothiazole, then washed with water and dried. 22.4 parts of tris-(benzothiazolyl-thio-methyl) copper phthalocyanine are obtained.

Analysis: Calculated S: 16.6 percent
Found 15.8 percent

EXAMPLE 2

25 parts of the $\alpha$ form of copper phthalocyanine are mixed with 1 part of tris-(benzothiazolyl-thio-methyl)-copper phthalocyanine (obtained as in Example 1) in 200 parts of water.

This suspension is mixed with 50 parts of glass balls having a diameter of about 0.5 mm in a cylindrical container provided with a central stirrer having planar discs. After grinding for 30 minutes, the ground suspension is separated from the grinding elements. The pigment is filtered off, drained and dried.

Examination of its stability to solvents is determined as follows:

1 g. of pigment mixture is dispersed in 100 ml of xylene, then the dispersion is heated under reflux for 2 hours. After cooling, the product is separated by filtration and dried after washing with ethanol. The X-ray diagram shows that 100 percent of α-phthalocyanine is still present in the pigment mixture.

When the pigment mixture is applied in an emulsion paint after treatment in the xylene, reduction of the colouring power with respect to the untreated product is not observed.

Under the same conditions the α form of the copper phthalocyanine (as the pure product) recrystallises completely in the form of large needles of the β form when the benzothiazolylthio-methylated derivative is not present. The treatment with xylene in such a case involves a distinct diminution in the colouring power as compared with the untreated product on application in emulsion paints.

EXAMPLE 3

If the α form of copper phthalocyanine used in Example 2 is replaced by a chlorinated phthalocyanine (α form) containing 2.8 percent of the chlorine, a pigment mixture is obtained which resists crystallisation in solvents and which, on application in emulsion paint, possesses the colouring power of the β pigment before the xylene treatment.

EXAMPLE 4

97.5 parts of a copper phthalocyanine pigment (β form) (which is obtained by grinding a crude phthalocyanine in the presence of calcium chloride and trichloroethylene) are mixed for 10 hours with 2.5 parts of tris (benzothiazolyl-thio-methyl) copper phthalocyanine. The obtained pigmentary dyestuff does not exhibit any increase in crystalline when it is treated for 2 hours in boiling xylene. Moreover, it has good thermal stability in plastics materials.

We claim:

1. A phthalocyanine pigment mixture which contains a compound of the formula:

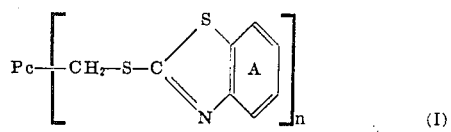

in which Pc is a phthalocyanine residue, the benzene nucleus A is unsubstituted or substituted by at least one alkyl group having up to 4 carbon atoms and n represents a whole number from 1 to 8.

2. A phthalocyanine pigment mixture as claimed in claim 1 wherein $n$ is 3 or 4.

3. A mixture as claimed in claim 3 wherein there is 1 to 20 percent, based on the total weight of the mixture, of the compound of formula (I) as defined in claim 1.

4. A mixture comprising 25 parts of copper phthalocyanine in α form and 1 part of tris-(benzothiazolyl-thio-methyl) copper phthalocyanine.

5. A mixture comprising 97.5 percent of copper phthalocyanine in β form and 2.5 percent of tris-(benzothiazolyl-thio-methyl) copper phthalocyanine.

6. A process for the stabilisation of phthalocyanine pigments which comprises incorporating therein at least one compound of the formula:

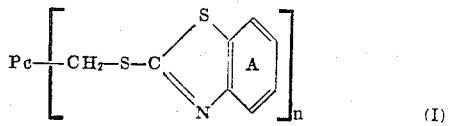

in which Pc is a phthalocyanine residue, the benzene nucleus A is unsubstituted or substituted by at least one alkyl group having up to 4 carbon atoms and $n$ represents a whole number from 1 to 8.

* * * * *

UNITED STATES PATENT OFFICE
CERTIFICATE OF CORRECTION

Patent No. 3,754,955  Dated August 28, 1973

Inventor(s) Jean Andre Paul Kienzle; Michel Ernest Antoine Huille; and Louis Antoine Cabut It is certified that error appears in the above-identified patent and that said Letters Patent are hereby corrected as shown below:

In the heading insert:

[73] Assignee: Ugine Kuhlmann, a corporation of France, Paris, France.

Signed and sealed this 8th day of October 1974.

(SEAL)
Attest:

McCOY M. GIBSON JR.
Attesting Officer

C. MARSHALL DANN
Commissioner of Patents